United States Patent
Bremer et al.

(10) Patent No.: US 6,416,281 B1
(45) Date of Patent: Jul. 9, 2002

(54) METHOD AND ARRANGEMENT FOR COOLING THE FLOW IN RADIAL GAPS FORMED BETWEEN ROTORS AND STATORS OF TURBOMACHINES

(75) Inventors: Joachim Bremer, Zürich (CH); Michajlo Bothien, Waldshut-Tiengen (DE); Jürg Greber, Wettingen (CH); Ulf Christian Müller, Kirchdorf (CH); Dirk Wunderwald, Baden (CH); Helmut Gieszauf, Nussbaumen (CH)

(73) Assignee: Asea Brown Boveri AG, Baden (CH)

(*) Notice: Subject to any disclaimer, the term of this patent is extended or adjusted under 35 U.S.C. 154(b) by 0 days.

(21) Appl. No.: 09/404,466

(22) Filed: Sep. 24, 1999

(30) Foreign Application Priority Data

Oct. 2, 1998 (DE) .................................. 198 45 375

(51) Int. Cl.⁷ .......................... B63H 1/14; F04D 31/00
(52) U.S. Cl. ................................. 416/95; 415/116
(58) Field of Search ...................... 416/93 R, 95, 416/96 R; 415/115, 116, 175, 176, 177, 178, 179, 180

(56) References Cited

U.S. PATENT DOCUMENTS

| | | | |
|---|---|---|---|
| 2,384,251 A | | 9/1945 | Hill |
| 3,405,913 A | * | 10/1968 | Chatfield et al. ........ 415/174.5 |
| 3,574,473 A | * | 4/1971 | Gaffal .................... 415/175 X |
| 3,946,565 A | * | 3/1976 | Cutler .................... 415/178 X |
| 3,966,351 A | * | 6/1976 | Sproule ................. 415/175 X |
| 4,460,313 A | * | 7/1984 | Austrem ................... 415/178 |
| 4,692,090 A | * | 9/1987 | Naka .................... 415/115 X |
| 4,948,056 A | * | 8/1990 | D'Errico ..................... 241/67 |
| 5,048,288 A | * | 9/1991 | Bessette et al. ......... 415/116 X |
| 5,271,248 A | * | 12/1993 | Crowe ........................ 62/505 |
| 5,541,975 A | * | 7/1996 | Anderson et al. ........... 378/130 |
| 5,779,439 A | * | 7/1998 | Dufour ....................... 415/155 |
| 6,035,627 A | * | 3/2000 | Liu ....................... 415/176 X |

FOREIGN PATENT DOCUMENTS

| | | |
|---|---|---|
| DE | 968 742 | 3/1958 |
| DE | 195 48 852 A1 | 3/1997 |
| DE | 196 52 754 A1 | 6/1998 |
| EP | 0 518 027 B1 | 12/1992 |
| GB | 14702 | 8/1912 |

* cited by examiner

Primary Examiner—John E. Ryznic
(74) Attorney, Agent, or Firm—Burns, Doane, Swecker & Mathis, L.L.P.

(57) ABSTRACT

A method for cooling the flow in radial gaps formed between rotors and stators of turbomachines, which method is improved with regard to its cooling effect. In addition, a simple, cost-effective and robust arrangement for realizing the method is to be specified. According to the invention, this is achieved in that a first cooling fluid is admitted to a stator part adjacent to the radial gap and a second, gaseous cooling fluid is introduced into the radial gap. To this end, either at least one recess is formed in the interior of the stator part adjacent to the radial gap or at least one cavity is arranged at the stator part. The recess or the cavity is connected to both a feed line and a discharge line for the first cooling fluid. In addition, at least one feed passage as well as a discharge device for the second cooling fluid are arranged at the radial gap.

10 Claims, 2 Drawing Sheets

METHOD AND ARRANGEMENT FOR COOLING THE FLOW IN RADIAL GAPS FORMED BETWEEN ROTORS AND STATORS OF TURBOMACHINES

FIELD OF INVENTION

The invention relates to a method and an arrangement for cooling the flow in radial gaps formed between rotors and stators of turbomachines, but in particular for cooling the flow in the radial gap between the compressor impeller and the casing of a radial compressor.

BACKGROUND OF THE INVENTION

To seal off rotating systems, non-contact seals, in particular labyrinth seals, are widespread in turbomachine construction. In the separating gap, through which flow occurs, between rotating and stationary parts, high friction power occurs as a result of the forming flow boundary layers. This leads to heating of the fluid in the separating gap and thus also to the heating of the components surrounding the separating gap. The high material temperatures result in a reduction in the service life of the corresponding components.

DE 195 48 852 A1 discloses a radial compressor of simple construction without a sealing geometry formed in the separating gap. In this case, too, the friction heat produced as a result of flow shearing layers at the rear wall of the compressor impeller causes heating of the compressor impeller and thus reduces its service life.

EP 0 518 027 B1 discloses air cooling for radial compressors with a sealing geometry on the rear side of the compressor impeller. To this end, an additional annular space is formed between the individual sealing elements on the casing wall side of the radial compressor. A cold gas which has a higher pressure than the pressure prevailing at the outlet of the compressor impeller is directed into this annular space. The air supplied acts as impingement cooling. In the process, it divides in the sealing region and flows mainly radially inward as well as outward. This is intended to additionally achieve a blocking effect against the flow of hot compressor air through the separating gap from the outlet of the compressor impeller.

However, the cooling effect which can be achieved in this way is limited because of a number of factors. For example, blowing in air leads to an increase in the pressure and thrust, as a result of which the bearing loading increases. In addition, the temperature of the available air also represents a limiting element. In the case of high-speed compressor wheels in particular, and at high pressure ratios, such as are usual in modern turbocharger construction, it is therefore possible for situations to arise in which this type of cooling is inadequate.

In addition to direct cooling, DE 196 52 754 A1 also discloses indirect cooling of the rear wall of the compressor impeller or of the medium flowing through the separating gap. To this end, a feed and distributing device connected to the lubricating-oil system of the turbocharger is arranged on or in the casing part disposed at the rear wall and forming with the latter the separating gap. The oil used for the bearing lubrication serves as cooling medium, for which purpose the lubricating-oil circuit of the turbocharger is tapped. A disadvantage of this cooling is the relatively high oil demand and the heat quantity to be additionally dissipated by the oil cooler. This leads to an increased overall volume of the cooler. In addition, in the event of an accident with damage to the corresponding parts, there is an increased risk of deflagration. Just as in the case of direct cooling, the cooling effect which can be achieved with indirect cooling is also limited, the cause for which, in addition to the temperature of the cooling liquids which can be used in practice, can be determined as the low overall volume which is available.

SUMMARY OF THE INVENTION

The invention attempts to avoid all these disadvantages. Its object is to provide a method for cooling the flow in radial gaps formed between rotors and stators of turbomachines, which method is improved with regard to its cooling effect. In addition, a simple, cost-effective and robust arrangement for realizing the method is to be specified.

According to the invention, this is achieved in that, a first cooling fluid is admitted to a stator part adjacent to the radial gap and a second, gaseous cooling fluid is introduced into the radial gap.

Because of the use of a first cooling fluid for the indirect cooling and, additionally, a second cooling fluid for the direct cooling of the part flow, admitted to the radial gap, of the working medium of the turbomachine, a considerably improved cooling effect and also improved cooling effectiveness can be achieved. Thus, only this double cooling of the radial gap permits a further reduction in the temperature of the thermally severely loaded rotor into temperature ranges which could not be achieved with the conventional cooling configurations.

To this end, at least one recess is formed in the interior of the stator part adjacent to the radial gap or at least one cavity is arranged at the stator part. The recess or the cavity is connected to both a feed line and a discharge line for the first cooling fluid. In addition, at least one feed passage and a discharge device for the second cooling fluid are arranged at the radial gap.

It is particularly preferable for water to be used as the first cooling fluid and air as the second cooling fluid.

Water has a somewhat higher density than the known lubricating oils, and a specific heat capacity which is about twice as high. Since the flow of heat to be carried away via a cooling medium is proportional to the product of density and specific heat capacity, when water is used as the first cooling fluid, the result is a distinct advantage by comparison with oil cooling. Given the same mass flow and the same temperature of the water, it is therefore possible for a greater quantity of heat to be extracted from the medium flowing through the radial gap via the stator part to be cooled. The cooling effect on those regions of the rotor which adjoin the radial gap is therefore likewise greater. In the converse direction, in order to dissipate the same quantity of heat, a smaller mass flow of cooling water is needed by comparison with lubricating oil, as a result of which the feed and discharge device for the cooling fluid can be dimensioned correspondingly smaller.

Depending on the wall thickness on the rotor side, which is to be kept as small as possible, an improved cooling effect can be achieved by guiding the water directly adjacent to the radial gap in the interior of the stator part. If, however, instead of the recess in the stator part, the cavity described is formed at the stator part, simpler and more cost-effective manufacture can be realized, likewise with a good cooling effect.

The use of air as second cooling fluid proves to be particularly advantageous, since it is available both in the environment and in the turbomachine itself in an adequate quantity, at an adequate pressure and with a suitably low temperature.

In a system consisting of an internal combustion engine, a charge-air cooler and an exhaust-gas turbocharger, either fresh water from outside the system or advantageously water present in the system is used as first cooling fluid. In the latter case, the cooling water located in a cooling-water circuit of the charge-air cooler is use or this purpose, and this cooling water is branched off upstream of the charge-air cooler. In this case, the fixed stator part is a casing part of a radial compressor, and this casing part bounds the radial gap relative to the rotor, that is to say relative to the rotating compressor impeller of an exhaust-gas turbocharger.

If, on the other hand, oil is used as first cooling fluid, then this can advantageously be branched off from the lubricating-oil system present in any case in the bearing casing of the turbo machine. In this way, a relatively simpler and therefore cost-effective arrangement can be produced. If the first cooling fluid is a gaseous medium, then this can be used both for the direct and for the indirect cooling.

In the event that helium or gases from very-low-temperature fluids, such as liquid nitrogen, carbon tetrachloride and benzole nitride are used as first and/or second cooling fluid, a particularly good cooling effect can be achieved.

BRIEF DESCRIPTION OF THE DRAWING

An exemplary embodiment of the invention is shown in the drawing with reference to an exhaust-gas turbocharger connected to an internal combustion engine. In the drawings.

Only the elements essential for the understanding of the invention are shown. The direction of flow of the working media is designated by arrows.

BRIEF DESCRIPTION OF THE PREFERRED EMBODIMENT

Figure 1:
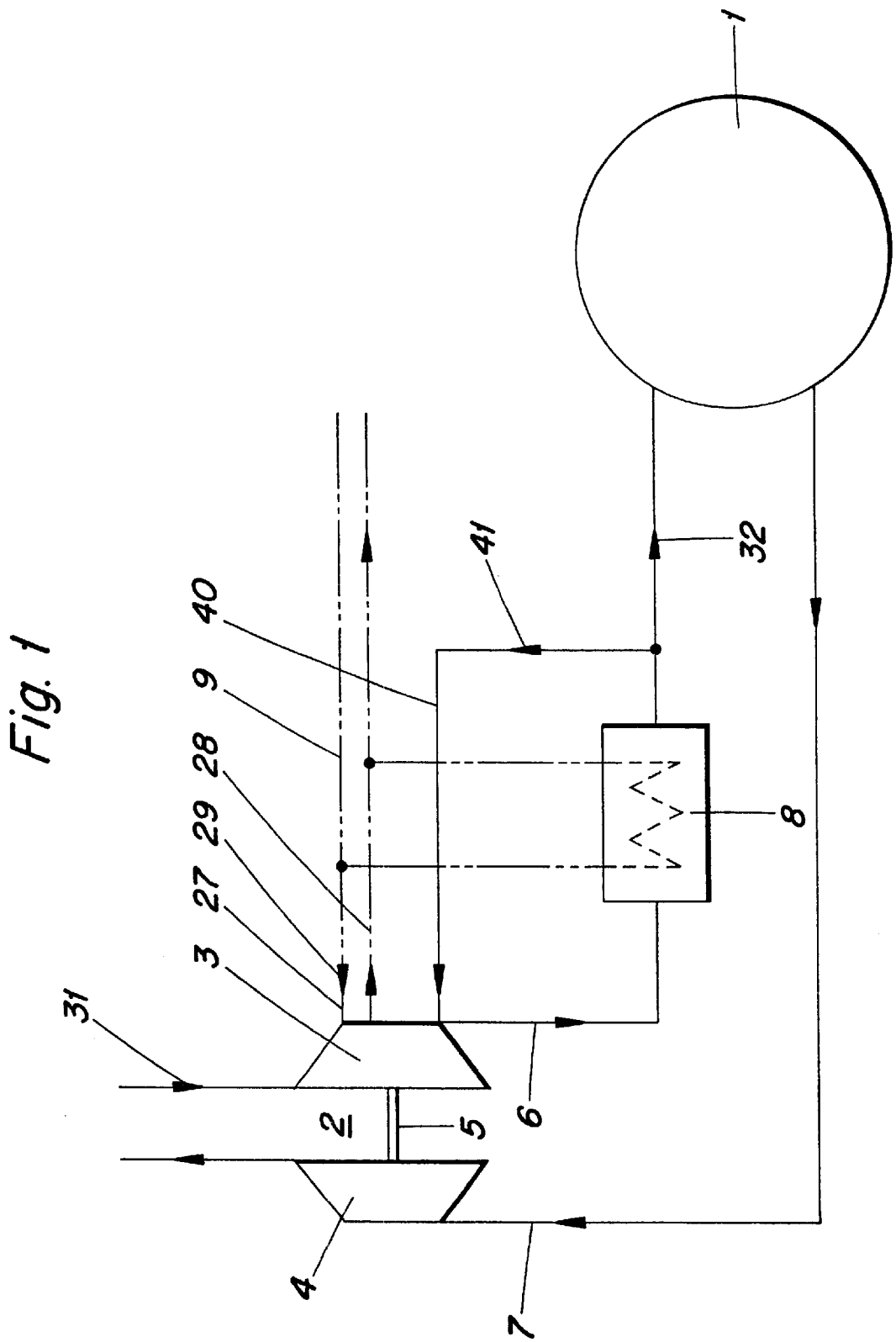
FIG. 1 shows a schematic representation of the exhaust-gas turbocharger connected to the internal combustion engine.

FIG. 1, in a schematic representation, shows an exhaust-gas turbocharger 2 interacting with an internal combustion engine 1 designed as a diesel engine. The exhaust-gas turbocharger consists of a radial compressor 3 and an exhaust-gas turbine 4, which have a common shaft 5. The radial compressor 3 is connected to the internal combustion engine 1 via a charge-air line 6, and the exhaust-gas turbine 4 is connected to the internal combustion engine 1 via an exhaust-gas line 7. A charge-air cooler 8 is arranged in the charge-air line 6, i.e. between the radial compressor 3 and the internal combustion engine 1. The charge-air cooler 8 has a cooling-water circuit 9 with a feed and discharge (not shown).

Figure 2:
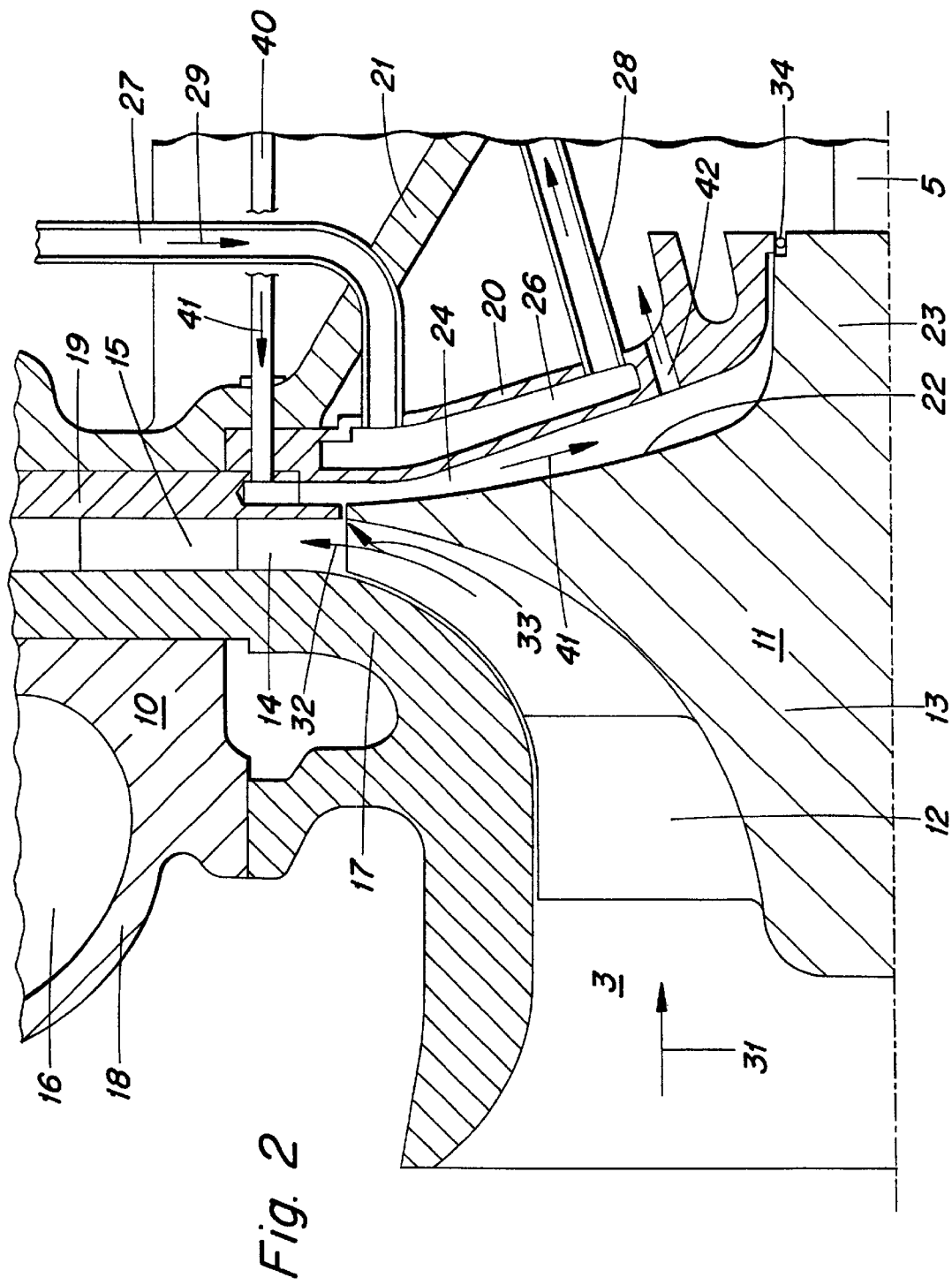
FIG. 2 shows a partial longitudinal section through the radial compressor of the exhaust-gas turbocharger.

The radial compressor 3 is equipped with a compressor casing 10, in which a rotor 11 designed as compressor impeller and connected to the shaft 5 is arranged. The compressor impeller 11 has a hub 13 fitted with a multiplicity of moving blades 12. A flow passage 14 is formed between the hub 13 and the compressor casing 10. Downstream of the moving blades 12, a radially arranged, bladed diffuser 15 adjoins the flow passage 14, the diffuser 15 in turn opening out into a spiral 16 of the radial compressor 3. The compressor casing 10 mainly comprises an air-inlet casing 17, an air-outlet casing 18, a diffuser plate 19 and a stator part 20 designed as an intermediate wall for a bearing housing 21 of the exhaust-gas turbocharger 2 (FIG. 2).

On the turbine side, the hub 13 has a rear wall 22 as well as a fastening sleeve 23 for the shaft 5. The fastening sleeve 23 is accommodated by the intermediate wall 20 of the compressor casing 10. Another suitable compressor-impeller/shaft connection may of course also be selected. Likewise, the use of an unbladed diffuser is also possible.

There is inevitably a separating gap between the rotating compressor impeller 11, i.e. its rear wall 22, and the fixed intermediate wall 20 of the compressor casing 10, this separating gap being designed as a radial gap 24 in the case of a radial compressor 3. The radial gap 24 is sealed off with respect to the bearing housing 21 by a sealing ring 34 arranged between the fastening sleeve 23 and the intermediate wall 20. Of course, this seal can also be realized by a labyrinth seal arranged in the radial gap 24 (not shown). An encircling recess 26 is formed in the intermediate wall 20 of the compressor casing 10 and is connected to both a feed line 27 and a discharge line 28 for a first cooling fluid 29. In order to achieve as high a cooling effect as possible at the adjacent compressor impeller 11, the intermediate wall 20 is designed to be as thin as possible on the compressor-impeller side of the recess 26. To this end, a corresponding core is integrally cast during the manufacture of the intermediate wall 20, which core has subsequently to be removed again. Of course, a thin-walled tube, which is closed at both ends and the interior space of which then forms the recess 26, can also be integrally cast in the intermediate wall 20 (not shown).

During operation of the exhaust-gas turbocharger 2, the compressor impeller 11 draws in ambient air as working medium 31, which passes as a main flow 32 via the flow passage 14 and the diffuser 15 into the spiral 16, is compressed further there and finally, via the charge-air line 6, is used for supercharging the internal combustion engine 1 connected to the exhaust-gas turbocharger 2. Beforehand, however, appropriate cooling of the working medium 31 heated up during the compression operation is effected in the charge-air cooler 8.

On its way from the flow passage 14 to the diffuser 15, the main flow 32, heated in the radial compressor 3, of the working medium 31 is also admitted as leakage flow 33 to the radial gap 24, as a result of which the compressor impeller 11 is additionally heated. However, since the operating temperature is greatest in the outer region of the compressor impeller 11, high material loading occurs there in particular. Cooling water branched off as cooling fluid 29 from the cooling-water circuit 9 of the charge-air cooler 8 is directed into the recess 26, arranged directly adjacent to this critical region, of the intermediate wall 20. Indirect cooling of the leakage flow 33 located in the radial gap 24 and thus also indirect cooling of the compressor impeller 11 therefore occur. In this case, the cooling fluid 29 is branched off upstream of the charge-air cooler 8, so that effective cooling can be achieved with the relatively cold cooling water. After the cooling action, the cooling fluid 29, which is now heated, is fed back into the cooling-water circuit 9 via the discharge line 28 downstream of the charge-air cooler 8 (FIG. 1). Of course, instead of the cooling water present in the system of internal combustion engine 1, charge-air cooler 8 and exhaust-gas turbocharger 2, fresh water may also be supplied as cooling fluid 29 from outside the system (not shown).

In addition to the indirect cooling already described, direct cooling of the leakage flow 33 is provided. To this end, a plurality of feed passages 40 opening tangentially to the rear wall 22 of the compressor impeller 11 into the radial gap 24 and intended for a second cooling fluid 41 are arranged so as to penetrate both the bearing housing 21 and the diffuser plate 19 (FIG. 2). The feed passages 40 are connected downstream of the charge-air cooler 8 to the charge-air line 6, so that cooled charge air is used as second cooling fluid 41 (FIG. 1). Of course, the second cooling fluid 41 can also be introduced into the radial gap at another location (not shown).

Pure film cooling of the entire rear wall 22 of the compressor impeller 11 is realized by the tangential introduction of the second cooling fluid 41. The second cooling fluid 41 replaces the hot leakage flow 33, so that the boundary layer forming on the rear wall 22 of the compressor impeller 11 is already formed from the start in particular by the cooled charge air. The subsequent drawing-off of the second cooling fluid 41 is effected via a discharge device 42 (not shown in any more detail) engaging in the intermediate wall 20 of the compressor casing 10. This combination of indirect and direct cooling results in a special cooling effect, since the two cooling possibilities complement one another in their effect and thus provide for a very significant temperature reduction in the compressor impeller 11.

Other cooling media, such as helium or gases from very-low-temperature fluids (for example liquid nitrogen, carbon tetrachloride, benzole nitride and so on) can also be used as first and second cooling fluid 29, 41.

If oil is used as first cooling fluid 29, this can be fed from the outside or can advantageously be branched off from the lubricating-oil system present in any case in the bearing casing 21 of the exhaust-gas turbocharger 2 (not shown). A relatively simpler and therefore cost-effective feed of this likewise suitable cooling fluid is possible in this way.

What is claimed is:

1. Apparatus for cooling the flow in a radial gap between a hub of a rotor and a stator of a turbomachie, in which a fixed stator part is arranged so as to define the radial gap relative to a hub of the rotor, comprising: a first fluid passage in the stator part, conduits for conducting a first fluid into and out of the first fluid passage, a second fluid passage comprising a path through the radial gap, and conduits for conducting a second fluid into and out of the second fluid passage.

2. The arrangement as claimed in claim 1, wherein the fixed stator part is designed as part of a compressor casing of a radial compressor, and this part bounds the radial gap relative to a rotating compressor impeller of an exhaust-gas turbocharger.

3. A method for cooling the flow in a radial gap formed between a hub of a rotor and a stator of a turbomachine comprising: admitting a first cooling fluid to a stator part adjacent to the radial gap and admitting a second, gaseous cooling fluid into the radial gap.

4. The method as claimed in claim 1, wherein the first cooling fluid is introduced into a recess formed in the stator part or into a cavity arranged at the stator part.

5. The method as claimed in claim 3, wherein the first cooling fluid is water.

6. The method as claimed in claim 5, wherein the first cooling fluid is fresh water from outside a system including an internal combustion engine, a charge-air cooler and an exhaust-gas turbocharger.

7. The method as claimed in claim 5, wherein water present in a system comprising an internal combustion engine, a charge air cooler and an exhaust gas turbocharger is used as the first cooling fluid.

8. The method as claimed in claim 7, wherein cooling water present in a cooling-water circuit of the charge-air cooler is used as the first cooling fluid and the later is branched off upstream of the charge-air cooler.

9. The method as claimed in claim 3, wherein oil, helium or gases from very-low-temperature fluids are used as the first cooling fluid.

10. The method as claimed in claim 3, wherein air, helium or gases from very-low-temperature fluids are used as the second, gaseous cooling fluid.

* * * * *